United States Patent [19]

Miller

[11] 4,230,473

[45] Oct. 28, 1980

[54] METHOD OF FABRICATING OPTICAL FIBERS

[75] Inventor: Stewart E. Miller, Locust, N.J.

[73] Assignee: Bell Telephone Laboratories, Incorporated, Murray Hill, N.J.

[21] Appl. No.: 20,995

[22] Filed: Mar. 16, 1979

[51] Int. Cl.³ .............................................. C03C 25/02
[52] U.S. Cl. ........................................ 65/3 A; 65/13; 65/18; 65/29
[58] Field of Search ........................ 65/3 A, 13, 18, 29

[56] References Cited

U.S. PATENT DOCUMENTS

| Re. 28,028 | 6/1974 | Maurer | 65/3 A |
|---|---|---|---|
| Re. 28,029 | 6/1974 | Keck et al. | 65/3 A |
| 3,966,446 | 6/1976 | Miller | 65/3 A X |
| 4,062,665 | 12/1977 | Izawa et al. | 65/3 A |
| 4,065,280 | 12/1977 | Kao et al. | 65/3 A |
| 4,135,901 | 1/1979 | Fujiwara et al. | 65/18 X |

FOREIGN PATENT DOCUMENTS

| 2531237 | 1/1977 | Fed. Rep. of Germany | 65/3 A |
| 2605483 | 4/1977 | Fed. Rep. of Germany | 65/3 A |

OTHER PUBLICATIONS

Electronics Letters, vol. 14, No. 17, "Low-OH . . . Deposition Method", Sudo et al., pp. 534, 535, 8/17/78.
Proceedings of IEEE "Technique for the Preparation of Low-Loss and Graded-Index Optical Fibers", pp. 1280, 1281, 9/1974.
Am. Cer. Soc. Bulletin, vol. 55, No. 5, "Preparation and Structural Characteristics of High Silica Graded-Index Fibers", O'Connor et al., pp. 513–516, 5/1976.

Primary Examiner—Robert L. Lindsay, Jr.
Attorney, Agent, or Firm—Sylvan Sherman

[57] ABSTRACT

The separate steps of forming an optical fiber preform and then drawing the fiber are combined into an essentially simultaneous process wherein a "stub" preform (18) is formed by means of the so-called "vapor-phase axial-deposition" method while the fiber (17) is simultaneously drawn from the end of the stub that is opposite to the end upon which the particulate matter (14, 15) is being deposited.

6 Claims, 3 Drawing Figures

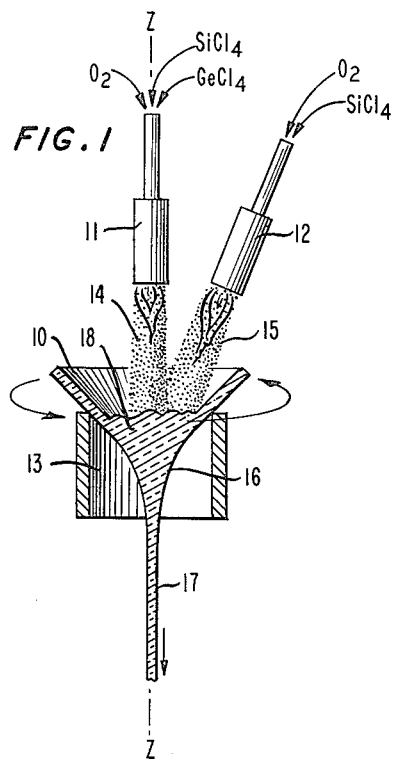

METHOD OF FABRICATING OPTICAL FIBERS

TECHNICAL FIELD

This invention relates to a method of fabricating optical fibers.

BACKGROUND ART

The fabrication of optical fibers typically comprises two distinct steps. First, a preform is made. Then, in an entirely separate process, the fiber is drawn from the preform. This two-step procedure has a number of limitations. For example, preforms, from which step index and graded index optical fibers are drawn, can be manufactured in any one of a variety of ways. One such way is the so-called "modified chemical vapor deposition" (MCVD) process in which a plurality of layers of suitably doped silicate glasses are deposited on the inside of a fused silica tube. After the requisite number of layers (i.e., typically about 50) have been deposited, the tube is collapsed into a solid rod which constitutes the preform from which a fiber can be drawn. For a more detailed discussion of the MCVD process, see the article by J. B. Mac Chesney, P. B. O'Connor and H. M. Presby entitled "A New Technique for the Preparation of Low-Loss and Graded-Index Optical Fibers," published in the *Proceedings of the IEEE*, September 1974, pp. 1280–1281. Also see, "Preparation and Structural Characteristics of High Silica, Graded Index Fibers" by P. B. O'Connor, J. B. Mac Chesney, H. M. Presby and L. G. Cohen, published in *The American Ceramic Society Bulletin*, Vol. 55, No. 5, May 1976, pp. 513–519.

In an alternative method, described in U.S. Pat. No. 3,966,446, the preform is fabricated by the axial deposition of particulate glass precursor material, the so-called "vapor-phase axial-deposition" (VAD) method. See also the article entitled "Low OH Content Optical Fibre Fabrication By Vapor-Phase Axial-Deposition Method," published in the Aug. 17, 1978 issue of *Electronics Letters*, pp. 534–535.

As can be seen, the preform fabrication process is a lengthy and costly one. While the ultimate cost of mass produced optical fibers can only be estimated at this time, it is fairly well established that the cost of the preform is approximately 50 to 70 percent of the total cost of the fiber.

In addition, preform fabrication is a demanding process inasmuch as the ultimate characteristics of the fiber are frozen into the preform. While various techniques have been devised for monitoring a fiber as it is drawn from the preform, these monitoring techniques are limited to controlling the size and shape of the fiber, but not its index profile which, as noted above, is defined by the preform. Accordingly, means have been sought for inspecting the preform before the fiber is drawn, thus providing the fiber fabricator with at least an opportunity to discard those preforms that are clearly defective. While this represents a saving insofar as it eliminates the costs associated with drawing, coating and testing fibers drawn from faulty preforms, it is clear that an even greater saving could be realized if the preform fabricating step itself was substantially simplified and controllable.

SUMMARY OF THE INVENTION

The separate steps of first forming a preform and then drawing the fiber are combined, in accordance with the present invention, into an essentially single, continuous operation wherein a "stub" preform is formed by means of the so-called "vapor-phase axial-deposition" (VAD) method while the fiber is simultaneously drawn from the end of the stub that is opposite to the end upon which the particulate glass material is being deposited.

The instant invention offers a clear manufacturing economy in that it substantially reduces the expenses associated with the standard preform-making operation.

It is a further advantage of the invention that it is the only process which provides the fabricator with a means for monitoring and controlling the fiber index profile during manufacture. Inasmuch as the stub is being generated as the fiber is being drawn, the fiber profile can be monitored and the composition of the precursor material altered accordingly. Thus, the invention provides a means for ensuring that the resulting fiber will have the desired transmission characteristics.

BRIEF DESCRIPTION OF THE DRAWING

FIG. 1 shows a first embodiment of the invention;

FIG. 2 shows an alternate embodiment of the invention; and

FIG. 3 shows an arrangement for monitoring and controlling the fiber profile.

DETAILED DESCRIPTION

Referring to the drawings, FIG. 1 illustrates the principal features of the present invention. In this illustrative embodiment, a funnel-like supporting member 10 is disposed below a pair of hydrolysis burners 11 and 12. An oven 13 surrounds the supporting member and serves to consolidate the soot deposited by the burners and to maintain the resulting glass in a molten state so that it can be drawn into a fiber.

The present invention employs the "vapor-phase axial-deposition" (VAD) process described in U.S. Pat. No. 3,966,446 which, for convenience, is incorporated herein by reference. Briefly, in this process each burner burns glass precursor materials to produce a glass soot 14, 15 which is deposited in the supporting member 10. In the start-up of the process, the aperture 16 at the narrow end of member 10 is covered, permitting the build-up of, and the consolidation of the particulate glass precursor material to form a small "stub" preform 18. The size of the stub is not critical. All that is required is an amount that is convenient to work with. When this build-up is complete, the aperture cover is removed and the fiber drawing process is commenced. Thereafter, a steady state condition is obtained wherein the soot is being deposited and consolidated at one end of the stub preform while the fiber is being simultaneously drawn from the other end of the stub.

In FIG. 1, two burners are shown for forming a graded index fiber. Typically, the materials fed into the axially aligned burner 11 would include oxygen ($O_2$), silicon tetrachloride ($SiCl_4$) and an index increasing material such as germanium tetrachloride ($GeCl_4$). Within burner 11, they form $SiO_2Ge$ soot which is blown by the flame towards the center of the stub. The second burner 12, which is located off axis, would typically include oxygen and $SiCl_4$ which form $SiO_2$ soot. This is blown towards the periphery of the stub. As a result of the diffusion of the higher and lower index materials, there is a grading of the index across the stub, which grading is preserved in the fiber as it is drawn. In the particular two-burner arrangement shown, it is advantageous to rotate the supporting member 10 about an axis z—z defined by the axis of symmetry of member 10 in order to produce an axially symmetrical distribution of materials. The z—z axis is the axis along which burner 11 is located, and also defines the direction along which the fiber is drawn.

FIG. 2 shows an alternate arrangement wherein the particulate matter is derived from a nozzle source 20 comprising a plurality of concentric cylinders. For purposes of illustration, two cylinders 21 and 22 are shown. In this embodiment, the higher index forming materials 10 are fed into the inner cylinder 21 whose axis lies along the symmetry axis of supporting member 30. The outer cylinder 22 is an annular member which surrounds, and is coaxially aligned with the inner cylinder 21. Lower index forming materials are fed into this portion of source 20. Heat is applied to the latter by means of a ring burner 25. In this arrangement the streams 23 and 24 of particulate material are fairly symmetrically applied and, hence, it may not be necessary to rotate supporting member 30. However, it would be advantageous to do so to insure a high level of axial symmetry.

As indicated hereinabove, it is an advantage of the present invention that the index profile of the fiber can be monitored and controlled during the fabrication process. In particular, either of the monitoring techniques disclosed in the copending application by D. Marcuse and H. Presby, Ser. No. 890,869, filed Mar. 28, 1978, or that of D. Marcuse, Ser. No. 896,347, filed Apr. 14, 1978 can be employed. In the former, the concentrations of the index-modifying dopants are measured by illuminating a portion of the fiber with ultraviolet (uv) radiation and then measuring the distribution of radiant energy derived from the fiber along a direction transverse to the longitudinal axis of the fiber. From this measurement, the concentrations of the index-modifying dopants and the index profile are determined. In the latter, the density distribution of the light focused by the fiber is measured.

FIG. 3, now to be considered, shows in block diagram an arrangement for applying these techniques to the present invention. As in the embodiment of FIG. 2, the glass precursor materials, typically including $SiCl_4$, $O_2$ and appropriate index-modifying dopants are supplied from suitable sources 40, 41 to a nozzle 42 through flow valves 43, 44 and 45. For purposes of illustration a three chambered nozzle is shown for greater control of the dopant distribution. In particular, a first mixture of one or more index modifying dopants, $SiCl_4$ and $O_2$ is connected to the inner cylinder of nozzle 42 through flow valve 45. A second mixture of dopants, $SiCl_4$ and $O_2$ is connected to the next outer annular cylinder of nozzle 42 through flow valve 45. A third mixture of $SiCl_4$ and $O_2$ is connected to the outermost cylinder through flow valve 43.

Streams 47, 48 and 49 of precursor materials, having different refractive indices, are consolidated in supporting member 58 from which a fiber 50 is drawn.

To monitor the fiber profile as it is being drawn, the fiber is illuminated along a small portion of its length by means of a suitable source 51. Advantageously, the illuminated portion is immersed in an index-matching material contained in a vial 52 through which the fiber is passed. A detector 53 for sensing the radiation from the fiber is suitably located adjacent to the fiber. The measurements thus made are coupled to a computer which makes the necessary calculations and compares the measured index profile with the desired index profile as stored in the computer. If their difference is within allowable limits, no action is required. If, however, the measured profile falls without these limits, corrective steps can be taken. The nature of these steps depends upon the strategy selected. For example, the typical graded index fiber has a power law index profile given by $$\eta(r) = \begin{cases} \eta_1[1 - 2(\frac{r}{a})^{\alpha}\Delta]^{\frac{1}{2}} & \text{for } r < a \\ \eta_2 = \eta_1[1 - 2\Delta]^{\frac{1}{2}} & \text{for } r > a \end{cases}$$

where
a is the core radius;
$\alpha$ is the exponent of the power law;
and $\Delta = (\eta_1^2 - \eta_2^2)/2\eta_1^2$.

It is known that the parameters $\alpha$, $\Delta$ and a determine the impulse response of a multimode fiber. In particular, the dependence of the rms pulse width on $\alpha$ is characterized by an extremely sharp minimum at an $\alpha$ value close to 2. Small departures from this optimum value cause the rms pulse width to increase dramatically. Thus, one strategy is to control the flow of materials in a manner to obtain the optimum $\alpha$ at all times.

An alternate strategy, based upon the findings of D. Marcuse, as described in his copending application Ser. No. 020,994, filed Mar. 16, 1979, and assigned to applicant's assignee, is to control the process such that the average value of the power law coefficient over a given length of fiber assumes the desired optimum value. Marcuse has found that large local departures of $\alpha$ from optimum are not necessarily harmful. So long as the average $\alpha$ is close to optimum, there is no significant broadening of the impulse response. Thus, if the measurements show that $\alpha$ is less than optimum along a given length of fiber, the flow rates are modified such that the $\alpha$-value is greater than optimum along a subsequent section of fiber.

Whatever strategy is applied, the fiber measurements are compared to a set of reference values that define the preferred index profile. This comparison generates a set of error signals which are used, in turn, to control the flow through the respective flow valves.

It will be noted that the profile measurements and corrections are made continuously as the fiber is being pulled. The total time it takes for a measurement to be translated into a feedback error signal depends upon the speed at which the computer operates. For modestly priced computers, this may be a matter of one to three minutes. This, in turn, corresponds to a correction every 20 to 600 meters of fiber, depending upon the rate at which the fiber is being pulled.

EXAMPLE

A fiber, having an 88 $\mu$m outside diameter, can be drawn in the manner described hereinabove at a rate of 1 km/hour with a glass particle deposition rate of 0.24 grams/minute. The latter is obtained with a 1–2 cm diameter nozzle source of the type shown in FIG. 2. With these pulling and deposition rates, a steady state condition is established whereby the fiber drawn is substantially equal to the glass being deposited.

I claim:
1. A method of fabricating an optical fiber comprising the steps of:
   forming (11) particulate precursor material capable of being consolidated into a glass (16);

directing a stream (14) of said particulate material onto a supporting member (10) where it is consolidated by heating (13) to form a stub preform;

CHARACTERIZED IN THAT:

said fiber (17) is continuously drawn from one end of said stub (18) as long as said particulate material continues to be deposited upon the opposite end of said stub.

2. The method according to claim 1 including the steps of forming and directing (12) at least a second stream (15) of particulate precursor material onto said stub (18).

3. The method according to claim 2 wherein the composition of the precursor material in said streams is different.

4. The method of fabricating an optical fiber comprising the steps of:

providing sources of materials including silicon, oxygen and refractive index modifying dopants (40,41);

combining (42, 46) said silicon, oxygen and selected dopants to form a plurality of streams (47, 48, 49) of particulate precursor material having different refractive indices;

directing said streams onto a supporting member (58) where they are consolidated by heating (59) to form a stub preform;

CHARACTERIZED IN THAT:

said fiber (50) is continuously drawn from one end of said stub for as long as said particulate material continues to be deposited upon the opposite end of said stub.

5. The method according to claim 4 including the step of rotating said supporting member about an axis substantially parallel to the direction of said streams.

6. The method according to claim 5 including the steps of:

monitoring (51, 52, 53, 54) the distribution of dopants within said fiber as it is being drawn;

and controlling the flow (43, 44, 45, 55) of said materials in response to said monitoring step.

* * * * *